United States Patent [19]

Wright et al.

[11] Patent Number: 4,469,258

[45] Date of Patent: Sep. 4, 1984

[54] TRAY WITH COMPOUND SEALED LID

[75] Inventors: Robert V. Wright, Burnsville; Charles Csiszar, Bloomington, both of Minn.

[73] Assignee: Champion International Corporation, Stamford, Conn.

[21] Appl. No.: 406,102

[22] Filed: Aug. 6, 1982

[51] Int. Cl.³ ............................................. B65D 5/64
[52] U.S. Cl. ..................................... 229/43; 206/631; 426/113
[58] Field of Search .................. 229/43; 206/631, 633; 426/113, 114, 129; 220/258

[56] References Cited

U.S. PATENT DOCUMENTS

| | | | |
|---|---|---|---|
| 3,061,087 | 10/1962 | Scrivens et al. | 206/633 |
| 3,079,057 | 2/1963 | Colarusso | 229/43 |
| 3,115,245 | 12/1963 | Schechter | 229/43 |
| 3,192,091 | 6/1965 | Hey et al. | 206/631 |
| 3,391,847 | 7/1968 | Christine et al. | 229/43 |
| 3,402,873 | 9/1968 | Lauterbach, Jr. | 229/43 |
| 3,454,210 | 7/1969 | Spiegel et al. | 229/43 |
| 3,464,832 | 9/1969 | Mullinix | 206/632 |
| 3,488,201 | 1/1970 | Pizarro | 229/43 |
| 3,547,338 | 12/1970 | Hemmes | 229/43 |
| 3,561,668 | 2/1971 | Bergstrom | 426/396 |
| 3,865,302 | 2/1975 | Kane | 229/43 |
| 4,055,672 | 10/1977 | Hirsch et al. | 229/43 |
| 4,171,084 | 10/1979 | Smith | 229/43 |
| 4,350,263 | 9/1982 | Hoffman | 220/258 |
| 4,361,237 | 11/1982 | Heiremans et al. | 229/43 |
| 4,382,513 | 5/1983 | Schirmer et al. | 229/43 |

FOREIGN PATENT DOCUMENTS 995121 8/1976 Canada ................ 206/633

Primary Examiner—Stephen P. Garbe
Attorney, Agent, or Firm—Evelyn M. Sommer; William W. Jones

[57] ABSTRACT

A tray is formed from coated paperboard or plastic and is provided with a top peripheral flange onto which a tray lid is sealed. The tray lid includes an inner membrane member which is secured to the tray flange by an adhesive coated into the membrane. Also included in the lid is an outer paperboard member which is adhesively secured to the membrane and tray flange. The outer lid member can be peeled off of the membrane without the membrane releasing from the tray flange. The membrane can then be peeled off of the tray flange to open the tray. A method for forming the sealed trays is also disclosed.

4 Claims, 5 Drawing Figures

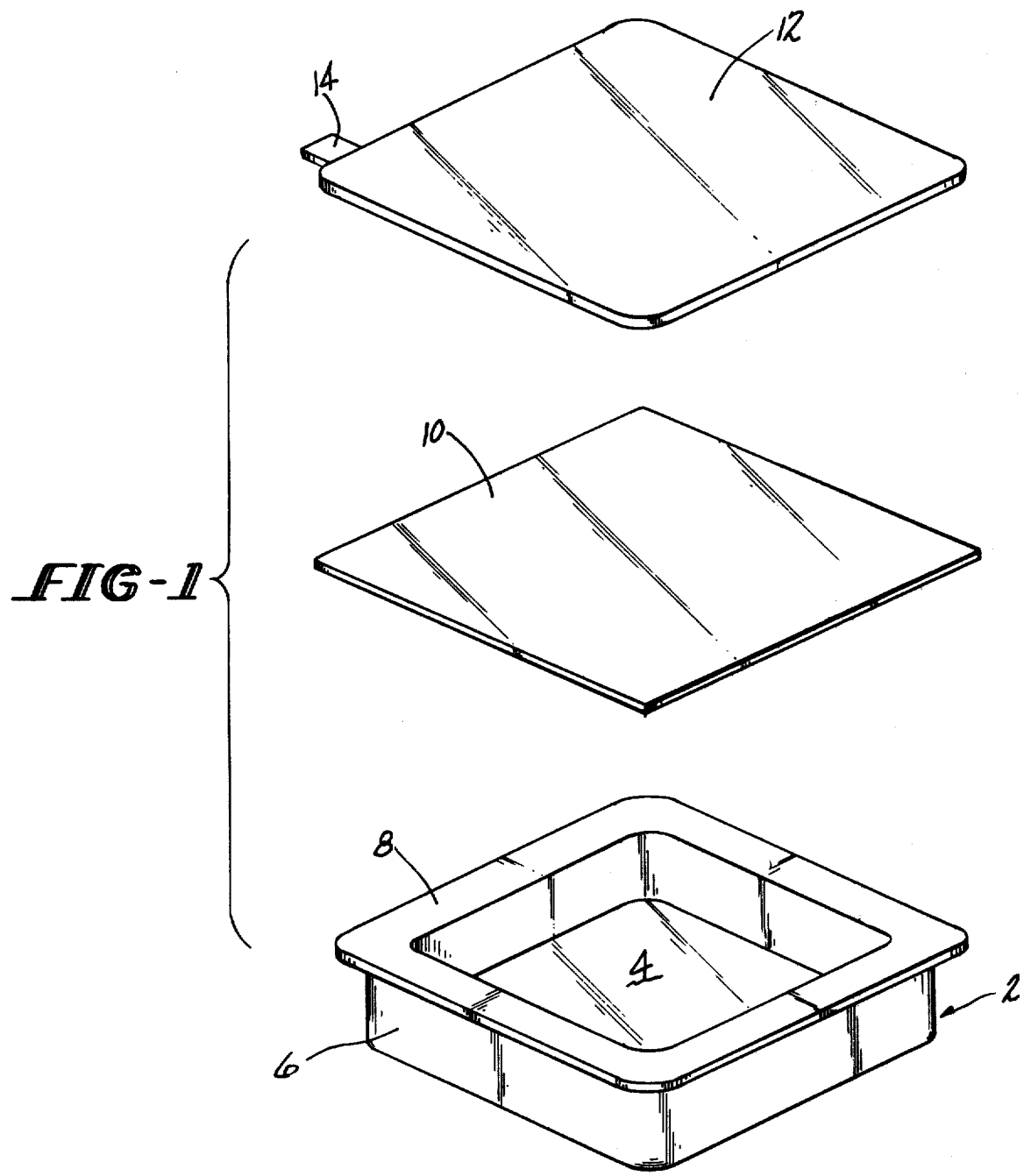

TRAY WITH COMPOUND SEALED LID

This invention relates to an improved sealed tray and a method of forming the same. The tray of this invention can be used for holding and cooking foodstuffs, holding pharmaceuticals or other products which are typically contained in sealed trays prior to use.

Sealed trays for sanitarily retaining various products are known in the prior art. Such trays are typically used for storing and cooking various foodstuffs, for storing pharmaceuticals, and for storing various other products which must be kept free of contamination. With the advent of microwave cooking, there is an increased need for such trays which can be used both to store various food products, and also to serve as a receptacle in which the food products can be cooked in the microwave oven. Such trays are also desirably useful to serve as cooking receptacles in conventional ovens.

Trays of this type should be compatible for both microwave cooking and conventional cooking, should provide a sanitary seal which will not fail during conventional handling or storage, which may include storage in a frozen state, and should be strong enough to be capable of being stacked, one atop the other. In order to provide the necessary sealing and the necessary stacking strength, it has been suggested in the prior art to provide a compound lid assembly for the trays. The lid assembly will include an inner membrane member and an outer paperboard member. The membrane provides the necessary seal, and the paperboard member provides the stacking strength and allows for desirable graphics display. It is desirable in such compound lid trays to permit removal of the paperboard member from the membrane member without concurrently removing the membrane from the tray. It would also be useful, should one so desire, to be able to concurrently remove both the paperboard member and the membrane from the tray without damaging the tray in any way.

Trays having compound lids including an inner membrane component and an outer paperboard component are disclosed in U.S. Pat. Nos. 3,298,505 to E. E. Stephenson and 3,464,832 to C. D. Mullinix. Both of these prior art trays provide for removal of the outer paperboard component from the inner membrane component without concurrent removal of the latter from the tray. The 3,298,505 patent teaches the use of an adhesive for securing the paperboard component to the membrane component which adhesive is thermoplastic, i.e., softened by heat, so that once the tray is heated, the paperboard can be peeled off of the membrane. The membrane is secured to the tray by crimping the flange of the tray over the edges of the membrane. The 3,464,832 patent teaches the use of a readily releasable adhesive for securing the paperboard component to the membrane component and heat sealing the membrane directly onto the tray flange. Thus the paperboard component can be peeled off of the membrane, but the membrane must be slit to remove it from the tray.

There are several drawbacks inherent in each of the above-noted prior art trays. By using a heat releasable adhesive to secure the paperboard component to the membrane, one can only remove the paperboard component from the membrane after the tray has been heated. Thus, removal of the paperboard component before cooking is not possible. Additionally, securement of the membrane to the tray by flange crimping may produce an ineffective seal between the membrane and the tray and could result in product contamination. On the other hand, heat sealing the membrane directly to the tray flange, as taught by the 3,464,832 patent results in a tray which is very difficult to open since the membrane must be slit to open the tray. Attempting to peel the membrane off of the tray will result in damage to the tray flange, and slitting the membrane will result in a ragged opening around the tray flange.

The tray and sealed compound lid of this invention constitutes an improvement over the above-noted prior art trays in that each component of the lid can be peeled away from the remainder of the tray, either separately, or concurrently, as one desires. In order to provide this advantage, the paperboard component of the lid is secured to the membrane by means of a first adhesive which is relatively releasable so that the paperboard component can be intentionally peeled off of the membrane, but will not accidentally delaminate during storage and handling. Additionally, the membrane is secured to the tray flange by means of a second adhesive which is also releasable to the extent that the membrane can be intentionally peeled off of the tray flange should one so desire. The second adhesive is, however, less releasable than the first adhesive so that removal of the paperboard component from the membrane will not result in concurrent removal or loosening of the membrane from the tray flange unless the membrane is intentionally gripped and peeled off of the tray along with the paperboard component. In this way, the paperboard component can be used in the tray package to provide stacking strength and can be used for graphics display when the package is on the shelf for consumer purchase. When the package is to be used, as for example, to cook the product in an oven, the paperboard component can be peeled away and discarded, leaving the membrane in place on the tray. If need be, to vent steam or vapors during cooking, the membrane can be pierced prior to cooking. Additionally, if the cooking process so requires, the paperboard component and the membrane can both be removed from the tray, without damage to the latter, prior to cooking the product in the tray. Thus the tray and lid combination of this invention is more versatile than the prior art tray-lid combinations since it can be used for cooking a greater variety of products, and it provides a neat undamaged container for serving the cooked food.

It is, therefore, an object of this invention to provide a tray, preferably usable for cooking a product having a two component sealed lid wherein the inner component is a resinous membrane which seals the tray and the outer component is a paperboard component providing strength and graphics display.

It is a further object of this invention to provide a tray of the character described wherein the paperboard component can be removed without removing the membrane.

It is an additional object of this invention to provide a tray of the character described wherein both the paperboard component and the membrane can be readily peeled off of the tray without damaging the tray prior to cooking the product.

It is yet another object of this invention to provide a tray of the character described wherein the membrane is adhered to the tray by a first adhesive and the paperboard component is adhered to the membrane by a second less strong adhesive.

These and other objects and advantages of this invention will become more readily apparent from the following detailed description of a preferred embodiment thereof taken in conjunction with the accompanying drawings, in which:

FIG. 1 is an exploded perspective view of a preferred embodiment of the tray and compound lid combination formed in accordance with this invention;

Figure 3:
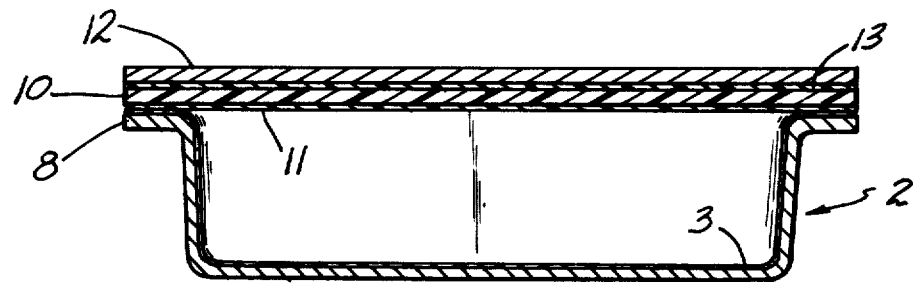
FIG. 3 is a cross-sectional view taken along line 3—3 of FIG. 2.

Referring now to the drawings, there is shown in FIG. 1 a preferred embodiment of the tray and compound lid combination formed in accordance with this invention. The tray 2 includes a bottom wall 4, a continuous up-standing side wall 6, and a flat, outwardly extending peripheral flange 8 extending from the upper edge of the side wall 6. The tray 2 can be formed from pressed paperboard coated with polyethylene terephthalate (PET), polypropylene, acrylics, or hot melt coatings at least on the entirety of its upper surface. The tray can also be formed from injection molded or thermoformed rigid plastics. The lid includes an inner membrane component 10 which can be formed from an oriented polyester film, a biaxially oriented nylon film, or an oriented polypropylene film. The lid also includes an outer paperboard component 12 prefereably having a pull tab 14 adjacent one corner thereof.

Figure 2:
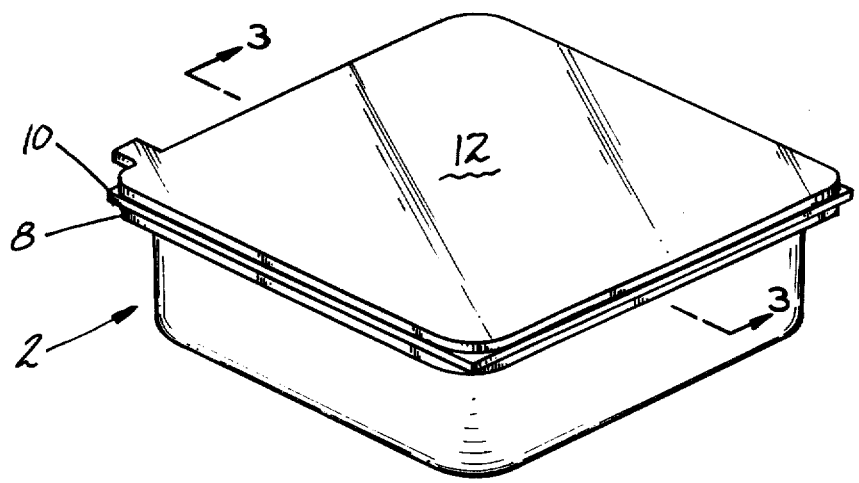
FIG. 2 is a perspective view of the assembled tray and lid combination.

Referring to FIG. 2, it will be noted that in the assembled package, the membrane 10 is adhesively secured to the tray flange 8 to seal the contents of the tray 2, and the paperboard component 12 is adhesively secured to the membrane 10 to add strength to the tray closure and provide an outer surface of the package suitable for display of graphics.

Referring to FIG. 3, the package is shown in cross-section with the respective adhesive coatings on the inner membrane and the outer paperboard component being shown as separate layers. It will be appreciated that the requisite adhesives are coated onto the membrane and outer paperboard component prior to the heat sealing assembly operation, which will be described hereinafter. As previously noted, the tray 2 is made of molded or thermoformed rigid plastic, or may be made of pressed paperboard coated at least on its inside surface with a coating 3 of polyethylene, PET, polypropylene, acrylics, or hot melt materials so as to render the tray 2 impermeable to water, oils and fats. The coating 3 extends over the top surface of the flange 8 of the tray 2. The membrane 10 has a coating 11 of adhesive applied to its inner surface, which coating is a modified polyester heat sealable material. The outer paperboard component 12 has a heat sealable material 13 coated onto its inner surface.

When the membrane 10 is a polyester film, the material 13 can be an extruded polyethylene layer applied to the component 12, or an extruded ethyl methyl acrylate layer, or an acrylic heat seal coating. When the membrane 10 is a nylon film, the material 13 can be ethylene vinyl acetate, an extruded polypropylene, or a resin film sold under the trademark Surlyn.

In each case, the heat seal adhesive layer 11 will provide a bond between the tray 2 and the membrane 10 which is stronger than the bond between the membrane 10 and the paperboard component 12 provided by the heat seal adhesive layer 13. Both adhesive layers provide a strong enough bond to resist accidental delamination of either of the lid components 10 and 12, and at the same time, both of the adhesive layers 11 and 13 provide a weak enough bond so that both lid components 10 and 12 can be intentionally concurrently peeled off of the tray 2 without deleteriously affecting the coating 3. The stronger bond provided by the adhesive layer 11 allows the paperboard component 12 to be peeled off of the membrane 10 without affecting the bond between the membrane 10 and the tray 2. Naturally, the membrane 10 can then be subsequently peeled off of the tray 2 whenever desired.

Figure 4:
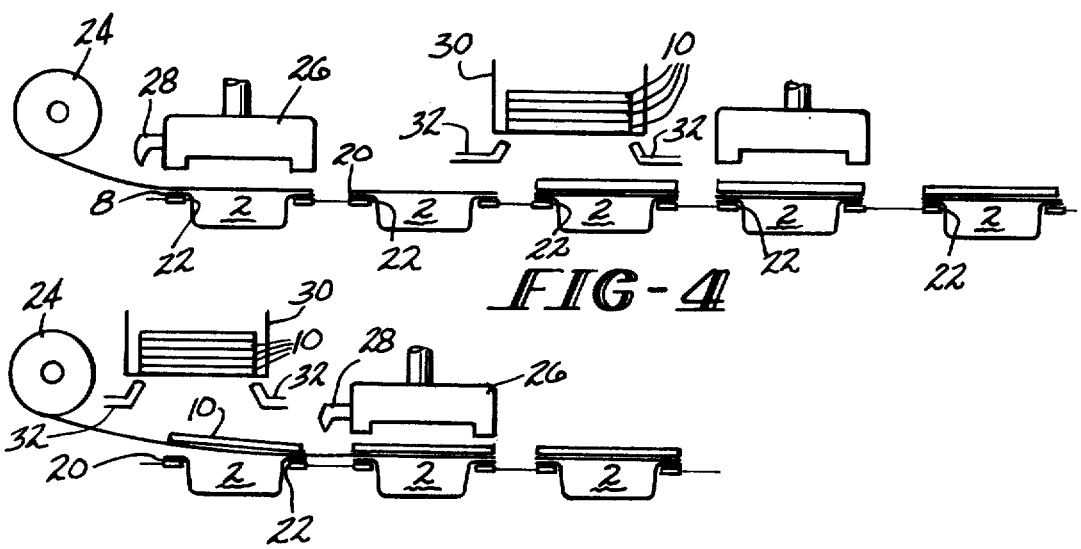
FIG. 4 is a somewhat schematicized view of an assembly line showing one method for assembling the tray and lid combinations of this invention.

Referring now to FIG. 4, there is shown one embodiment of an assembly line for forming the tray-lid package described previously. A plurality of trays 2 are fed serially along with the flange 8 of each tray 2 being supported by a moving support belt 20 in the form of an endless chain with openings 22 for receiving the individual trays 2. The trays 2 are loaded into the belt openings 22 and are then moved beneath a roll 24 of the membrane material which is precoated with the heat seal adhesive and which is fed off of the roll 24 over the trays 2 as the latter pass beneath the roll 24. Downstream of the roll 24 there is disposed a first heat seal device 26 which is reciprocally mounted above the trays. The heat seal device 26 descends upon the tray having the coated membrane disposed over the tray flange and heat seals the membrane onto the tray flange, while severing the membrane with a knife 28. The sealed tray is then advanced by the belt 20 until it underlies a hopper 30 from whence the paperboard lid components 10 are dispensed, one at a time, down onto the sealed trays. The paperboard components 10 are precut and precoated with the heat seal adhesive and a plurality of hot air ducts 32 are disposed beneath the hopper 30 to direct hot air against the lower side of the lowermost paperboard component 10 to presoften the adhesive coated thereon. After the paperboard component 10 is dropped onto the sealed tray, the latter is advanced to a position beneath a second reciprocating heat sealing device 34 which serves to heat seal the paperboard component 10 to the membrane and tray. The package is then completed.

Figure 5:
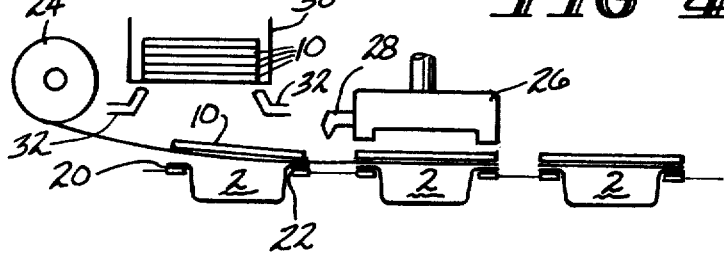
FIG. 5 is a view similar to FIG. 4 but showing another method for assembling the tray and lid combination of this invention.

Referring now to FIG. 5, there is disclosed an alternate embodiment of an assembly line for forming the tray-lid package of this invention. In the alternate embodiment, the trays 2 are carried on an endless belt 20 in pockets 22 therein. The open trays pass beneath a roll 24 of membrane material which has been precoated with the heat seal adhesive material and which is fed off of the roll 24 down onto the trays. The trays then pass beneath the paperboard component hopper 30 from which the precoated, presoftened paperboard components 10 are dropped, one at a time, onto the membrane overlying the tray. The trays then pass beneath a reciprocating heat sealing device 26 which is lowered onto the trays to concurrently seal the membrane and paperboard component 10 in place. A knife 28 cuts the trailing edge of the membrane during the heat sealing operation. The tray-lid package is then completed.

The membrane can be sealed to the tray flange when the heat sealer is heated to a temperature in the range of 375°–400° F. and a pressure of 65 psi is applied to the membrane by the heat sealer for one half second duration. The coated paperboard component can be separately sealed to the membrane when the heat sealer is heated to a temperature of about 400° F. and a pressure of 65 psi is applied to the coated paperboard for a period of about five and one half seconds. Concurrent heat sealing of the membrane and coated paperboard component can be obtained when the heat sealer is set at a temperature of 400° F. and a pressure of 65 psi is applied for five and one half seconds. In both cases, adequate sealing will be obtained and easy release of the sealed components will be achieved.

Since many changes and variations of the disclosed embodiment of the invention may be made without departing from the inventive concept, it is not intended to limit the invention otherwise than as required by the appended claims. While this disclosure specifically describes formed press trays it is intended to include other style trays such as folded paperboard trays.

What is claimed is:

1. A package adapted for cooking a food product in a microwave or convection oven, said package comprising:
   (a) a tray having a bottom wall, an upwardly extending side wall, and a peripheral flange extending outwardly from an upper edge of said side wall said tray being formed from paperboard coated with a resinous material selected from the group consisting of polyethylene, polyethylene terephthalate, polypropylene, acrylics and hot melts;
   (b) a resinous membrane;
   (c) a layer of a first adhesive on an inner surface of said resinous membrane, said first adhesive binding said resinous membrane to said tray flange to seal the interior of said tray;
   (d) a paperboard lid;
   (e) a layer of a second adhesive on an inner surface of said paperboard lid, said second adhesive binding said paperboard lid to said resinous membrane;
   (f) the bond produced by said second adhesive being weaker than the bond produced by said first adhesive whereby said paperboard lid can be peeled off of said resinous membrane while said resinous membrane remains in sealing engagement with said tray flange; and
   (g) the bond produced by said first adhesive being sufficiently weak that said resinous membrane can be peeled off of said tray flange to open the package without damaging the resinous coating on the tray flange.

2. The package of claim 1 wherein said resinous membrane is an oriented film selected from the group consisting of polyesters, nylon and polypropylene, and said first adhesive is a heat sealable modified polyester.

3. The package of claim 2, wherein said resinous membrane is a polyester and said second adhesive is a heat sealable resin selected from the group consisting of polyethylene, ethyl methyl acrylate and acrylics.

4. The package of claim 2, wherein said resinous membrane is nylon and said second adhesive is a heat sealable resin selected from the group consisting of ethylene vinyl acetate, polypropylene, and Surlyn resins.

* * * * *